United States Patent
Babazadeh et al.

(10) Patent No.: US 10,122,256 B1
(45) Date of Patent: Nov. 6, 2018

(54) METHOD AND APPARATUS FOR ZERO-CURRENT SWITCHING CONTROL IN SWITCHED-CAPACITOR CONVERTERS

(71) Applicant: Infineon Technologies Austria AG, Villach (AT)

(72) Inventors: Amir Babazadeh, Laguna Hills, CA (US); Rakesh Renganathan, Warwick, RI (US); Danny Clavette, Greene, RI (US); Christian Rainer, Klagenfurt (AT)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 15/648,764

(22) Filed: Jul. 13, 2017

(51) Int. Cl.
*H02M 3/18* (2006.01)
*H02M 1/08* (2006.01)
*H02M 7/219* (2006.01)
*H02M 1/00* (2006.01)

(52) U.S. Cl.
CPC ........... *H02M 1/083* (2013.01); *H02M 7/219* (2013.01); *H02M 2001/0058* (2013.01)

(58) Field of Classification Search
CPC . H02M 2001/0009; H02M 2001/0058; H02M 1/38; H02M 7/1623; H02M 7/1626; H02M 3/158; H02M 3/1584; H02M 7/08; H02M 3/07; H02M 2003/071; H02M 2003/072; H02M 3/073; H02M 2003/075; H02M 2003/076; H02M 2003/077; H02M 2003/078; H02M 1/083; H02M 7/219; H02M 2001/005; H02M 2001/007

USPC ...... 323/225, 266, 268, 272; 363/59, 60, 61, 363/76, 79, 80, 82
See application file for complete search history.

(56) References Cited

U.S. PATENT DOCUMENTS

| | | | |
|---|---|---|---|
| 4,178,612 A | 12/1979 | Dudley et al. | |
| 4,316,101 A | 2/1982 | Minner et al. | |
| 5,101,334 A | 3/1992 | Plagge et al. | |
| (Continued) | | | |

OTHER PUBLICATIONS

Li, Yanchao et al., "Multilevel Modular Switched-Capacitor Resonant Converter with Voltage Regulation", IEEE Applied Power Electronics Conference and Exposition (APEC), Mar. 2017, pp. 88-93.

(Continued)

*Primary Examiner* — Alex Torres-Rivera
(74) *Attorney, Agent, or Firm* — Murphy, Bilak & Homiller, PLLC

(57) ABSTRACT

A switched-capacitor converter includes a plurality of legs coupled between the input and a rectifier at the output. Each leg includes a capacitor. A first group of legs is coupled to a first branch of the rectifier, and a second group is coupled to a second branch of the rectifier. A switch device is connected to each leg. The controller alternates switching of the switch devices connected to the first and second groups of legs to transfer energy from input to output. The switching is modified based on zero-crossing information which indicates when current through each switch device crosses or nearly crosses zero, so that each switch device connected to the same group of legs is turned off when current through that switch device crosses or nearly crosses zero and remains off until all switch devices connected to that group have been turned off for a predetermined amount of time.

22 Claims, 8 Drawing Sheets

(56) References Cited

U.S. PATENT DOCUMENTS

| | | | |
|---|---|---|---|
| 8,817,501 B1* | 8/2014 | Low | H02M 3/07 363/59 |
| 9,054,576 B2* | 6/2015 | Kang | H02M 3/07 |
| 9,831,776 B1* | 11/2017 | Jiang | H02M 3/158 |
| 9,917,517 B1 | 3/2018 | Jiang et al. | |
| 2007/0200538 A1* | 8/2007 | Tang | H02M 3/157 323/237 |
| 2012/0223583 A1* | 9/2012 | Cooley | H02J 3/385 307/82 |
| 2014/0002038 A1* | 1/2014 | Hsu | H02M 3/1584 323/271 |
| 2014/0285167 A1* | 9/2014 | Audy | H02M 3/156 323/282 |
| 2015/0016163 A1* | 1/2015 | Krainer | H02M 3/33592 363/78 |
| 2015/0097546 A1* | 4/2015 | Pan | H02M 3/158 323/311 |
| 2015/0102793 A1* | 4/2015 | Chen | H02M 3/1588 323/282 |
| 2015/0365013 A1* | 12/2015 | Hameed | H02M 7/25 363/126 |
| 2016/0028304 A1* | 1/2016 | O'Day | H02M 1/4225 363/89 |
| 2016/0141951 A1 | 5/2016 | Luo et al. | |
| 2017/0106820 A1 | 4/2017 | Nakamura et al. | |

OTHER PUBLICATIONS

Du, Sixing et al., "A Startup Method for Flying-Capacitor Modular Multilevel Converter (FC-MMC) With Effective Damping of LC Oscillations", IEEE Transactions on Power Electronics, vol. 32, No. 7, Jul. 2017, pp. 5827-5834.

Sepahvand, Hossein et al., "Start-up Procedure and Switching Loss Reduction for a Single-Phase Flying Capacitor Active Rectifier", IEEE Transactions on Industrial Electronics, vol. 60, No. 9, Sep. 2013, pp. 3699-3710.

* cited by examiner US 10,122,256 B1:

METHOD AND APPARATUS FOR ZERO-CURRENT SWITCHING CONTROL IN SWITCHED-CAPACITOR CONVERTERS

TECHNICAL FIELD

The present application relates to switched-capacitor converters, in particular zero-current switching control in switched-capacitor converters.

BACKGROUND

Switched-capacitor converters are a class of voltage converters which provide energy transfer and voltage conversion using capacitors. Each leg of a switched-capacitor converter includes a capacitor, and a switch device is connected to each leg for controlling charging of the capacitors. In some implementations, some of the legs also include inductors which makes those legs resonant. In either case, different groups of the converter legs are coupled to different branches of a rectifier at the output. The different groups of converter legs are switched alternately to transfer energy from the input to the output. The rectifier, such as a half-bridge rectifier, rectifies the energy transferred from the capacitors during each switching cycle. The rectified output can be applied directly to a load, or to another converter stage such as a buck converter, a POL (point-of-load) converter, etc.

For a switched-capacitor converter in which each leg is switched with the same duty cycle, the current in each leg ideally is identical. However, due to tolerances of the inductors, capacitors, etc., some or all of the currents in the different legs are phase misaligned, meaning that the current in some legs crosses zero before or after the current in other legs. Even with inductor and/or resonant capacitor tolerances as low as 10%, a significant decrease in converter efficiency occurs due to the phase misalignment of the leg currents.

Ideally, the switch connected to each resonant leg is switched under ZCS (zero-current switching) conditions in which a switch device is turned off when current through that switch device crosses zero and remains off for some dead time. Otherwise, at high current levels under non-ZCS conditions, switching loses are quite due to the high number of switch devices employed. However, standard 50% duty cycle switching does not allow for ZCS in practical implementations where the components have tolerances and other nonlinearities are present, and ZCS is lost for some or all of the legs. Conventional approaches implement complete open loop control, and simply increase the dead time between turning on and turning off the switches of each leg in an attempt to avoid positive or negative switch currents at turn off time. This approach decreases system efficiency, by lengthening each switch cycle with significant additional dead time.

SUMMARY

According to an embodiment of a switched-capacitor converter, the converter comprises an input, an output, a rectifier at the output, and a plurality of legs coupled between the input and the rectifier. Each leg comprises a capacitor. A first group of the legs is coupled to a first branch of the rectifier, and a second group of the legs is coupled to a second branch of the rectifier. The switched-capacitor converter also comprises a switch device connected to each leg, and a controller operable to alternate switching of the switch devices connected to the first and the second groups of legs to transfer energy from the input to the output. The switching is modified based on zero-crossing information which indicates when current through the switch device connected to each leg crosses or nearly crosses zero, so that each switch device connected to the same group of legs is turned off when the current through that switch device crosses or nearly crosses zero and remains off until all switch devices connected to that group of legs have been turned off for a predetermined amount of time.

According to an embodiment of a method of operating a switched-capacitor converter that includes an input, an output, a rectifier at the output, and a plurality of legs coupled between the input and the rectifier, each leg comprising a capacitor, a first group of the legs being coupled to a first branch of the rectifier and a second group of the legs being coupled to a second branch of the rectifier, and a switch device connected to each leg, the method comprising: alternately switching the switch devices connected to the first and the second groups of legs to transfer energy from the input to the output; and modifying the switching based on zero-crossing information which indicates when current through the switch device connected to each leg crosses or nearly crosses zero, so that each switch device connected to the same group of legs is turned off when the current through that switch device crosses or nearly crosses zero and remains off until all switch devices connected to that group of legs have been turned off for a predetermined amount of time.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide zero-current switching control for switched-capacitor converters. Zero-current switching conditions can be determined e.g. by sensing or estimating the current or derivative of the capacitor voltage of each resonant leg of a switched-capacitor converter, and using this zero-crossing information to achieve exact ZCS (zero-current switching) or near ZCS switching control for each leg of the converter. Doing so enables the converter to determine the optimal switching frequency and have ZCS or near-ZCS conditions on all legs, maximizing converter efficiency.

Figure 1:
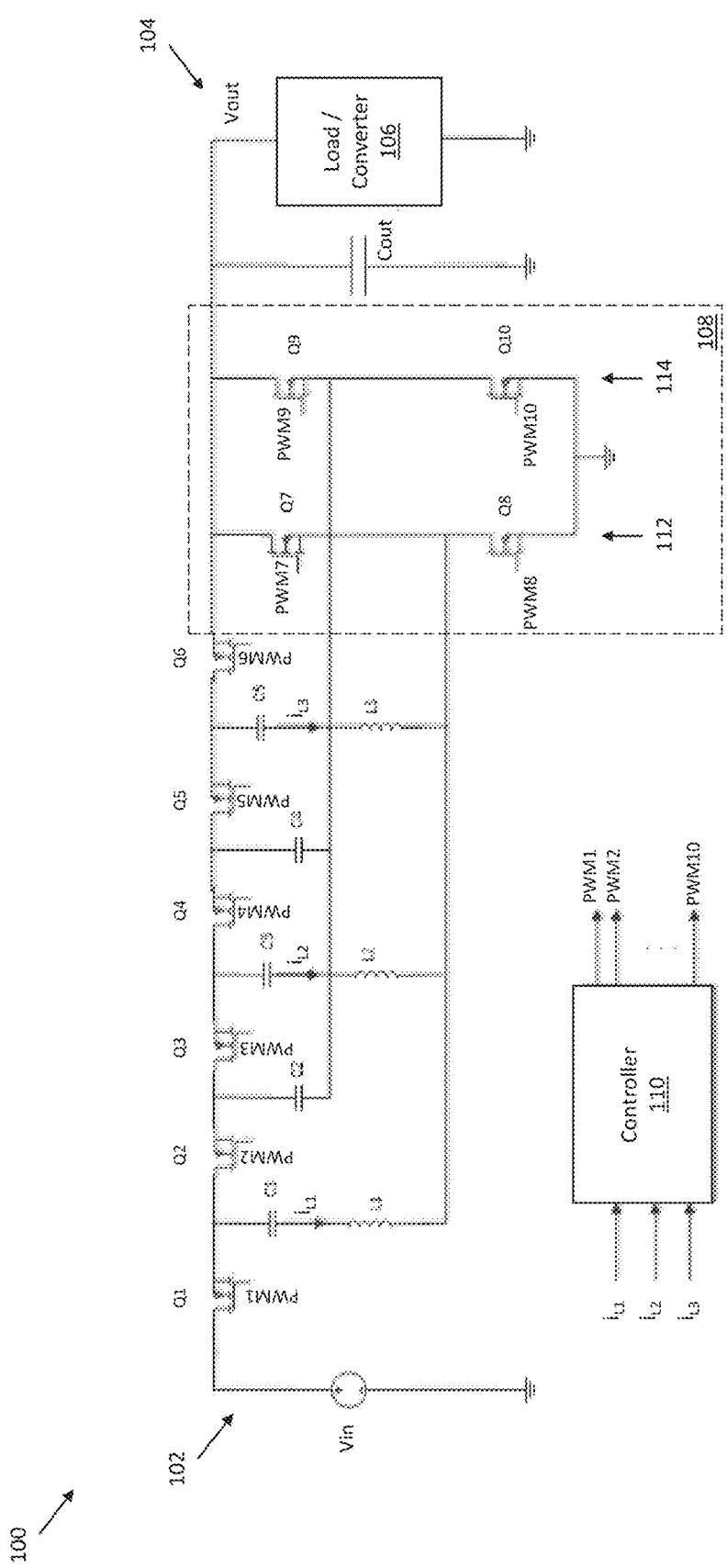
FIG. 1 illustrates a block diagram of an embodiment of a switched-capacitor converter that implements zero-current switching control.

FIG. 1 illustrates an embodiment of a switched-capacitor converter 100 with zero-current switching control. The switched-capacitor converter 100 has an input 102 coupled to a voltage source Vin, an output 104 coupled to a load or other converter 106, a rectifier 108 and output capacitor Cout at the output 104, and a plurality of legs coupled between the input 102 and the rectifier 108. The rectified output voltage Vout can be applied directly to a load or another converter stage 106 such as a buck converter, a POL (point-of-load) converter, etc. For example, the input voltage Vin may range from 36 V to 54 V and the output voltage Vout may range from 6V to 9V in a multi-stage converter case. In each case, a controller 110 for the switched-capacitor converter 100 maintains proper switching of the converter legs to transfer energy from the input 102 to the output 104.

Each leg of the switched-capacitor converter 100 includes a respective capacitor Cy. Some of the legs, also referred to herein as resonant legs, include an inductor Lx connected to the corresponding capacitor Cy. A switch device Qx is connected to each leg, for controlling charging of the capacitors Qx. Six legs in total are shown in FIG. 1, where resonant leg 1 includes resonant capacitor C1 and inductor L1, leg 2 includes flying capacitor C2, resonant leg 3 includes resonant capacitor C3 and inductor L2, leg 4 includes flying capacitor C4, resonant leg 5 includes resonant capacitor C5 and inductor L3, and leg 6 includes flying capacitor C6. The switch devices Qx can be discrete power transistor dies (chips), integrated power stages which include at least the power transistors that form the individual switch device and the corresponding driver and control circuitry, etc.

The (first) group of resonant legs which includes resonant capacitors C1, C3 and C5 is coupled to a first branch 112 of the rectifier 108, and the (second) group of non-resonant legs which includes flying capacitors C2, C4 and C6 is coupled to a second branch 114 of the rectifier 108. The rectifier is a switched capacitor rectifier in that for each group of legs, the AC currents are in opposite phase. While the first group is charging, the other group is discharging. The rectifier switches alternatively connect each leg to the output when the current is being discharged, and to ground when the current is charging. In one embodiment, each branch 112, 114 of the rectifier 108 includes two switch devices Qm/Qn coupled as a half bridge. Other rectifier configurations are possible.

With the exemplary 6:1 topology shown in FIG. 1 and with n=3, the steady state voltages across the capacitors of the respective legs are as follows:

$$V_{C5}=1*V\text{out}$$

$$V_{C4}=2*V\text{out}$$

$$V_{C3}=3*V\text{out}$$

$$V_{C2}=4*V\text{out}$$

$$V_{C1}=5*V\text{out}$$

The conversion ratio for the exemplary system shown in FIG. 1 is Vout/Vin=2n=6. In general, the switched-capacitor converter 100 can include any even number of legs. For example, the switched-capacitor converter 100 can include two legs and Vout/Vin=2n=2, or the switched-capacitor converter 100 can include four legs and Vout/Vin=2n=4, or the switched-capacitor converter 100 can include eight legs and Vout/Vin=2n=6, etc. The number of legs depends on the application in which the converter 100 is to be used.

The controller 110 of the switched-capacitor converter 100 alternates switching of the first (resonant) and the second (non-resonant) groups of legs to transfer energy from the input 102 to the output 104. Under conventional control, switch devices Q1, Q3, Q5, Q7 and Q10 would be switched via a first PWM (pulse width modulation) signal with 50% duty cycle and switch devices Q2, Q4, Q6, Q8 and Q9 would be switched via the complementary PWM signal with dead time between the PWM signals, as illustrated in FIG. 2.

Figure 2:
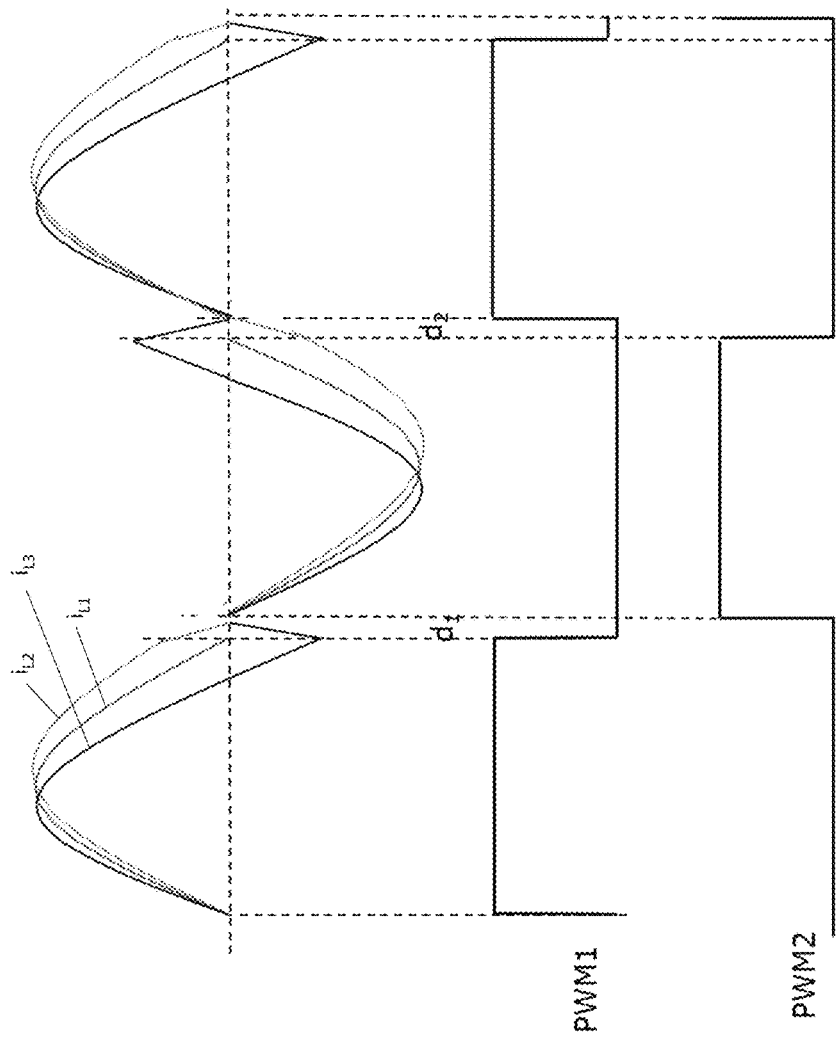
FIG. 2 illustrates current waveforms for the switched-capacitor converter shown in FIG. 1, operated under conventional PWM control.

FIG. 2 shows the resonant currents $i_{L1}$, $i_{L2}$ and $i_{L3}$ in the switched-capacitor converter 100 of FIG. 1 which result under standard PWM switching control. In FIG. 2, 'PWM1' represents the signal for controlling switch devices Q1, Q3, Q5, Q7 and Q10, 'PWM2' represents the signal for controlling switch devices Q2, Q4, Q6, Q8 and Q9, and 'd1' and 'd2' represent respective dead times before the corresponding groups of switches can be turned on again. Due to component tolerances and other nonlinearites within the converter 100, the resonant currents $i_{L1}$, $i_{L2}$ and $i_{L3}$ have different zero-crossing times. In FIG. 2, resonant current $i_{L3}$ crosses zero in less than 50% duty cycle of PWM1, which results in negative current in switch device Q5 when Q5 is turned off at the falling edge of PWM1. Resonant current $i_{L1}$ crosses zero at about 50% duty cycle of PWM1, which results in no or negligible current in switch device Q1 when Q1 is turned off at the falling edge of PWM1. Resonant current $i_{L2}$ is greater than zero at 50% duty cycle of PWM1, which results in positive current in switch device Q3 when Q3 is turned off at the falling edge of PWM1. Under conventional open loop control, dead times d1 and d2 must be made large enough to mitigate such zero-crossing conditions. However, this results in lower converter efficiency, because the duty cycle must be reduced to accommodate larger dead times.

The embodiments described herein modify the switching of the converter legs based on zero-crossing information which indicates when current through the switch device Qx connected to each leg crosses or nearly crosses zero. This way, each switch device Q1/Q3/Q5, Q2/Q4/Q6 connected to the same group of legs can be turned off when the current through that switch device crosses or nearly crosses zero and remains off until all switch devices connected to that group of legs have been turned off for a predetermined amount of time (dead time).

Figure 3:
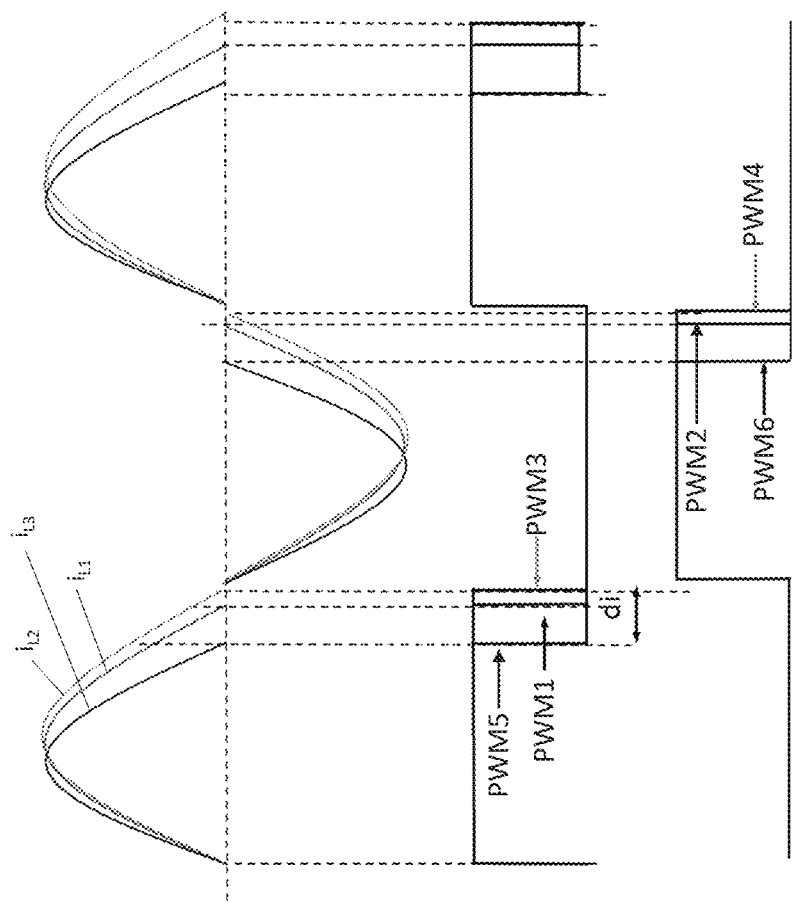
FIG. 3 illustrates current waveforms for the switched-capacitor converter shown in FIG. 1, operated under zero-current switching control.

FIGS. 1 and 3 illustrate an embodiment in which the controller 110 produces an individual PWM signal (PWM1, PWM2, etc.) for switching each switch device Qx connected to the legs of the switched-capacitor converter 100. The controller 110 adjusts the duty cycle of each PWM signal based on the zero-crossing information for the corresponding switch device Qx, so that the duty cycle for each switch device Qx corresponds to the zero-crossing current of that switch device Qx. In FIG. 3, signal PWM1 controls switch device Q1 and has about 50% duty cycle. The zero-crossing information for switch device Q1 indicates that current $i_{L1}$ the leg to which Q1 is connected crosses zero at or near the 50% duty cycle point. Hence, the controller 110 does not adjust the duty cycle of signal PWM1, because switch device Q1 turns off at or near the zero-crossing point of $i_{L1}$ with 50% duty cycle. The same ZCS condition does not apply to switch devices Q3 and Q5 in the example illustrated in FIG. 3. The zero-crossing information for switch device Q3 indicates that current $i_{L2}$ in the leg to which Q3 is connected crosses zero after the 50% duty cycle point. Conversely, the zero-crossing information for switch device Q5 indicates that current $i_{L3}$ in the leg to which Q5 is connected crosses zero before the 50% duty cycle point.

Based on the zero-crossing information for switch device Q3, the controller 110 can increase the duty cycle of signal PWM3 which controls switch device Q3 to greater than 50%, so that Q3 turns off at or near the zero-crossing point of $i_{L2}$. Based on the zero-crossing information for switch device Q5, the controller 110 can decrease the duty cycle of signal PWM5 which controls Q5 to less than 50%, so that Q5 likewise turns off at or near the zero-crossing point of $i_{L3}$. With this variable duty cycle approach, each switch device Q1/Q3/Q5, Q2/Q4/Q6 connected to the same group of legs is turned off when the current through that switch device Qx crosses or nearly crosses zero and remains off until all switch devices Q1/Q3/Q5, Q2/Q4/Q6 connected to in that group of legs have been turned off for a predetermined amount of time (dead time). For example, in the case of switch device Q5 in FIG. 3, Q5 experiences an effective dead time of di before being permitted to turn on again during the next (negative) half of the switching cycle. While FIG. 3 shows all switch devices aligned at the rising edge of the corresponding PWM signals, the switch devices instead can be aligned at the falling edge of their respective PWM signals.

According to another embodiment, the controller 110 produces a single PWM signal with a fixed duty cycle (e.g. 50%) for switching each switch device Qx connected to the legs of the switched-capacitor converter 100. According to this embodiment, each switch device Qx includes an integrated power stage configured to sense output current of the power stage, as will be described in more detail later herein in connection with FIG. 8. The zero-crossing information for each switch device Qx corresponds to the output current sensed by the integrated power stage that includes that switch device Qx. The zero-crossing point for a particular switch device Qx is identified when the output current measurement provided by the power stage that includes the switch device Qx crosses zero.

Each integrated power stage can adjust the duty cycle of the main PWM signal provided by the controller 110, based on the sensed output current for that power stage so that the duty cycle of the switch device Qx included in the power stage corresponds to the zero-crossing current of that switch device Qx. In the example of FIG. 1, signals PWM1, PWM3, PWM5, PWM7 and PWM10 correspond to the main PWM signal from the controller 110 and signals PWM2, PWM4, PWM6, PWM8 and PWM9 correspond to the complementary PWM signal, e.g., as shown in FIG. 2. Duty cycle adjustments are then made by the individual power stages according to this embodiment, each of which has current sense capability. For the different $i_{Lx}$ zero-crossing points shown in the example of FIG. 3, the individual integrated power stages would make the corresponding duty cycle adjustments, not the controller 110. Integrated power stages with current sense capability are well known in the voltage converter arts, and therefore no further explanation is provided in this regard.

As explained above, the zero-crossing information used to modify switching of the legs indicates when the current through the switch device Qx connected to each leg crosses or nearly crosses zero. In one embodiment, the zero-crossing information corresponds to the sensed current through each switch device Qx connected to the legs. In another embodiment, the zero-crossing information corresponds to the derivative of the sensed capacitor voltage across each capacitor Cx of the legs.

As shown in FIG. 3, the controller 110 switches the first group of legs on during a first part (first half) of each switching cycle and off during a second part (second half) of each switching cycle via PWM control. The controller 110 similarly switches the second group of legs off during the first part of each switching cycle and on during the second part of each switching cycle also via PWM control. Based on the zero-crossing information available to the controller 110, the controller 110 turns off each switch device Qx at its zero-current crossing point to achieve ZCS and keeps the switch device off, e.g. in HiZ mode, until the slowest switch device connected to the same group of legs turns off plus some dead time.

The controller 110 can apply the same control sequence for the next half cycle, if new zero-crossing information is unavailable for that half cycle. That is, the controller 110 can use the same zero-crossing information determined for the present switching to modify the point at which each switch device Q1/Q3/Q5 connected to the first group of legs is switched off during the first part of the present switching cycle and to modify the point at which each switch device Q2/Q4/Q6 connected to the second group of legs is switched off during the second part of the present switching cycle. However, if full waveforms are available, a similar approach can be used for the next half cycle based on new zero-crossing information for that half cycle. That is, the controller 110 can use first zero-crossing information determined for the first part of the present switching cycle to modify the point at which each switch device Q1/Q3/Q5 connected to the first group of legs is switched off during the first part of the present switching cycle. The controller 110 uses second (new) zero-crossing information determined for the second part of the present switching cycle to modify the point at which each switch device Q2/Q4/Q6 connected to the second group of legs is switched off during the second part of the present switching cycle. Various embodiments for determining the zero-crossing information are described next.

Figure 4:
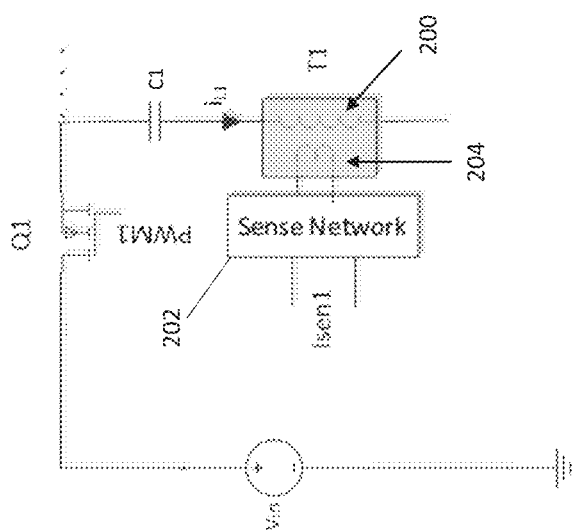

FIG. 4 illustrates an embodiment in which each leg in the first group includes an inductor connected to the capacitor Cx of that leg, the inductor being formed by a first winding 200 of a current transformer Tx. Full resonant current can be achieved by the respective current transformers Tx. According to this embodiment, the zero-crossing information for each leg in the first group is obtained by a sense circuit 202 connected to a second winding 204 of the current transformer Tx of that leg. The sense circuit 204 senses ($I_{Lx}$) the zero-crossing current of the switch device Qx connected to the corresponding leg.

Figure 5:
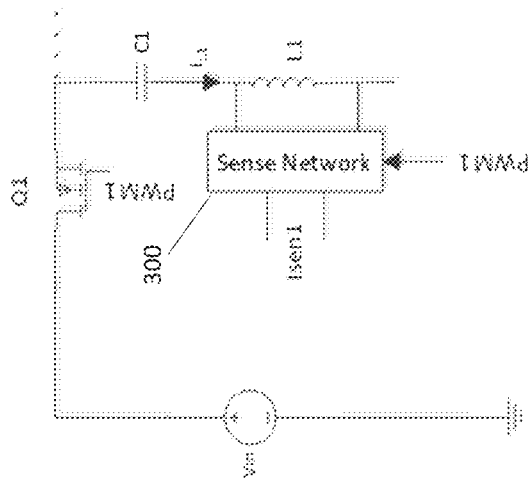
FIGS. 4 through 8 illustrate respective block diagrams of different embodiments of circuitry for providing zero-crossing information for the legs of the switched-capacitor converter shown in FIG. 1.

FIG. 5 illustrates an embodiment in which each leg in the first group includes an inductor Lx connected to the capacitor of that leg. The zero-crossing information for each leg in the first group is obtained by a DCR sense circuit 300 connected to the inductor Lx of that leg. The DCR sense circuit 300 senses ($I_{Lx}$) the zero-crossing current of the switch device Qx connected to the corresponding leg. Full and half resonant current waveforms can be achieved by the DCR method. The sense circuit 300 can be modified to account for the relatively large common mode inductor voltage (the inductor voltage is at ground or Vout, depending on switch state). In one embodiment, the sense circuit 300 uses the corresponding PWM signal to determine when the leg is on, to block the common mode. In another embodiment, the sense circuit 300 senses the inductor current $i_{Lx}$ just in the cycle when the corresponding switch device Qx is on. Additional intelligence can be provided to control when DCR sensing is performed. For example, an integrated power stage that includes the switch device Qx can have a current sense amplifier which can be used to determine when the switch device Qx is on.

In an alternative approach to what is shown in FIG. 5, the capacitor voltage $V_{Cx}$ can be sensed by a method similar to that of inductor DCR if the position of the inductor Lx and the capacitor Cx are reversed. The derivative (CxdV/dT) of the sensed capacitor voltage $V_{Cx}$, which represents the current in the corresponding leg, can be used for zero-cross detection. The peak value of the sensed capacitor voltage $V_{Cx}$ instead can be used for zero-cross detection.

In yet another, a comparator can be used to predict/determine the zero-crossing point, without sensing the corresponding current.

Figure 6:
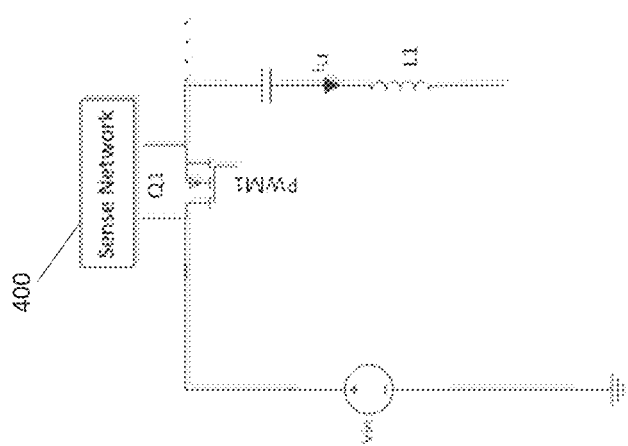

FIG. 6 illustrates an embodiment in which the zero-crossing information for each leg is derived from an on-state resistance ($R_{DSon}$) measurement of the switch device Qx connected to that leg. Half resonant current waveforms can be achieved by $R_{DSon}$ current sensing. Any standard sense circuit 400 configured to sense $R_{DSon}$ of a switch device can be used.

Figure 7:
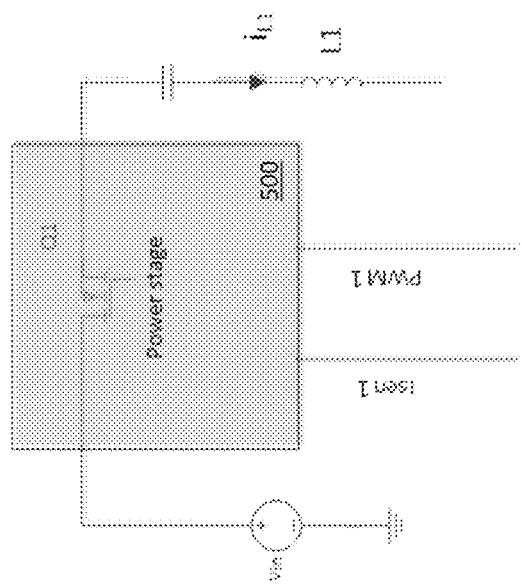

FIG. 7 illustrates an embodiment in which each switch device Qx connected to at least the first group of legs is implemented as an integrated power stage 500 with output current sensing capability ($I_{Lx}$). According to this embodiment, the zero-crossing information for each leg in the first group is derived from the output current sensed ($I_{Lx}$) by the integrated power stage 500 of that leg.

Figure 8:
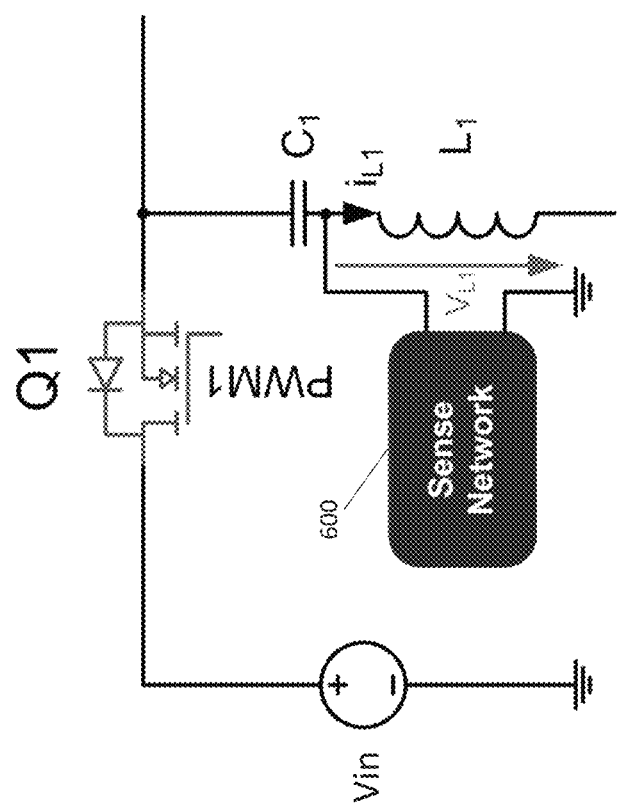

FIG. 8 illustrates an embodiment in which each leg in the first group of legs includes an inductor Lx connected to the capacitor Cx of that leg. The zero-crossing information for each leg in the first group is obtained by a sense circuit 600 configured to sense the voltage $V_{Lx}$ across the inductor Lx of that leg, referenced to ground. The inductor voltage measurements are provided to the controller 110. The controller 110 accounts for mismatch in sensing the zero-crossing of the voltage $V_{Lx}$ across each inductor Lx based on these voltage measurements. Depending on the zero-crossing point, the phase shift of the corresponding resonant current $i_{Lx}$ can be calculated (estimated) by the controller 110. The controller 110 adjusts the PWM signal for the respective legs, based on the mismatch in the zero-crossing sense signal of the voltage across the corresponding inductor Lx.

Figure 9:
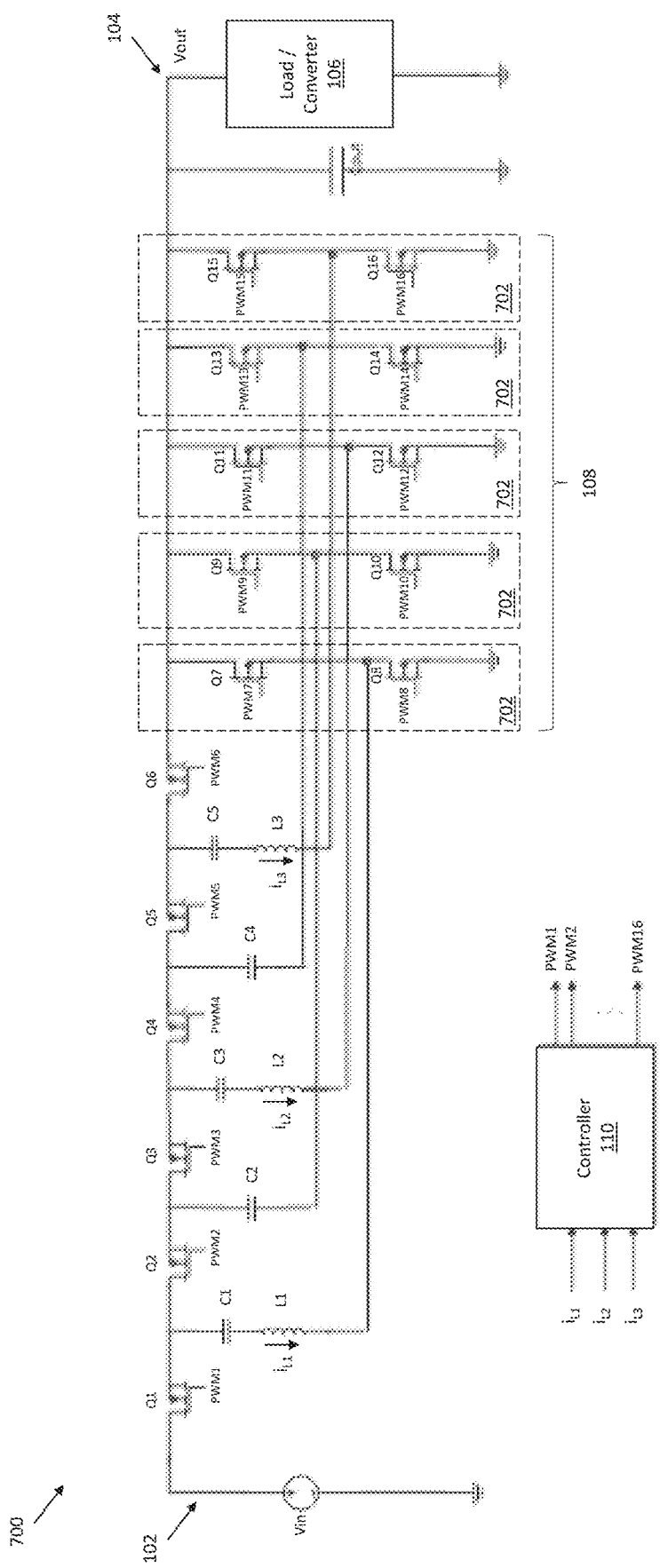
FIG. 9 illustrates a block diagram of another embodiment of a switched-capacitor converter that implements zero-current switching.

FIG. 9 illustrates another embodiment of a switched-capacitor converter 700 that senses or estimates the resonant current or the derivative of the sensed capacitor voltage for each leg of the converter 700, and uses this zero-crossing information to achieve exact ZCS or near ZCS control for each leg of the converter 700. The embodiment shown in FIG. 9 is similar to the one shown in FIG. 1. Different, however, each branch of the rectifier 108 is implemented by an integrated power stage 702.

Figure 10:
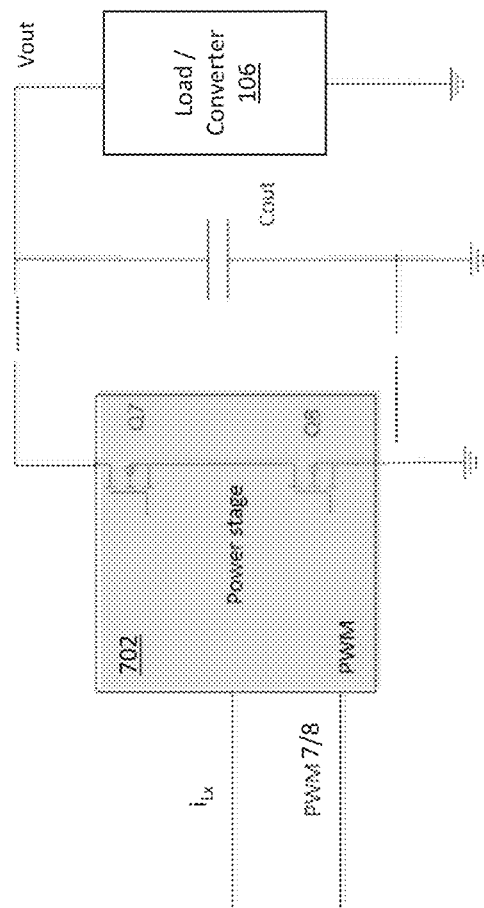
FIG. 10 illustrates a block diagram of an embodiment of an integrated power stage implementation of the rectifier branches included in the switched-capacitor converter shown in FIG. 9.

FIG. 10 shows one half bridge of the rectifier 108 implemented as an integrated power stage 702 which includes the individual switch devices Q7/Q8 of that half bridge, the corresponding driver and control circuitry, etc. The integrated power stage 702 also includes sense circuitry for sensing current ($I_{Lx}$) through the corresponding rectifier branch. According to this embodiment, each rectifier branch is independent (separate) from the other branches, and each capacitor terminal of the respective legs of the switched-capacitor converter 700 are individually coupled to the corresponding integrated power stage 702. Each power stage 702 provides current information ($I_{Lx}$) directly, which is representative of the individual leg currents. The zero-crossing information for each leg is derived from the sensed current information provided by the integrated power stage 702 of the branch coupled to that leg. Any integrated current sense method can be used with this embodiment. Each rectifier branch can be implemented as one or more integrated half bridges coupled in parallel.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A switched-capacitor converter, comprising:
an input;
an output;
a rectifier at the output;
a plurality of legs coupled between the input and the rectifier, each leg comprising a capacitor, a first group of the legs being coupled to a first branch of the rectifier and a second group of the legs being coupled to a second branch of the rectifier;
a switch device connected to each leg; and
a controller operable to alternate switching of the switch devices connected to the first and the second groups of legs to transfer energy from the input to the output,
wherein the switching is modified based on zero-crossing information which indicates, for each leg of the first group of legs, when current through the switch device connected to said each leg crosses or nearly crosses zero, so that each switch device connected to a leg within the first group of legs is turned off when the current through that switch device crosses or nearly crosses zero and remains off until all switch devices connected to legs within the first group of legs have been turned off for a predetermined amount of time, and
wherein at least two switch devices connected to legs within the first group of legs are turned on for partially overlapping time intervals within a switching cycle, the partially overlapping time intervals having different time durations.

2. The switched-capacitor converter of claim 1, wherein the zero-crossing information comprises sensed current through each switch device.

3. The switched-capacitor converter of claim 1, wherein the zero-crossing information comprises a derivative of a sensed capacitor voltage across each capacitor of the legs.

4. The switched-capacitor converter of claim 1, wherein the controller is operable to produce an individual PWM (pulse width modulation) signal for switching each switch device, and wherein the controller is operable to adjust the duty cycle of each PWM signal based on the zero-crossing information for the corresponding switch device so that the duty cycle for each switch device corresponds to the zero-crossing current of that switch device.

5. The switched-capacitor converter of claim 1, wherein each switch device connected to the first group of legs is implemented as an integrated power stage configured to sense output current of the power stage, wherein the controller is operable to produce a single PWM (pulse width modulation) signal for switching each switch device connected to the first group of legs, and wherein each integrated power stage is operable to adjust the duty cycle of the PWM signal based on the output current of the power stage so that the duty cycle for the switch device included in the power stage corresponds to the zero-crossing current of that switch device.

6. The switched-capacitor converter of claim 1, wherein each leg in the first group includes an inductor connected to the capacitor of that leg, wherein the inductor is formed by a first winding of a current transformer, and wherein the zero-crossing information for each leg in the first group is obtained by a sense circuit connected to a second winding of the current transformer of that leg, the sense circuit being configured to sense the zero-crossing current of the switch device connected to the corresponding leg.

7. The switched-capacitor converter of claim 1, wherein each leg in the first group includes an inductor connected to the capacitor of that leg, and wherein the zero-crossing information for each leg in the first group is obtained by a DCR sense circuit connected to the inductor of that leg, the DCR sense circuit being configured to sense the zero-crossing current of the switch device connected to the corresponding leg.

8. The switched-capacitor converter of claim 1, wherein each leg in the first group includes an inductor connected to the capacitor of that leg, and wherein the zero-crossing information for each leg in the first group is obtained by a sense circuit configured to sense a voltage across the inductor of that leg, referenced to ground, and wherein the controller is operable to account for mismatch in sensing the zero-crossing of a voltage across each inductor.

9. The switched-capacitor converter of claim 1, wherein each switch device connected to the first group of legs is implemented as an integrated power stage configured to sense output current of the power stage, and wherein the zero-crossing information for each leg in the first group is derived from the output current sensed by the integrated power stage of that leg.

10. The switched-capacitor converter of claim 1, wherein the zero-crossing information for each leg is derived from an on-state resistance measurement for the switch device connected to that leg.

11. The switched-capacitor converter of claim 1, wherein each branch of the rectifier comprises an integrated power stage configured to sense current through that branch, and wherein the zero-crossing information for each leg is derived from the current sensed by the integrated power stage of the branch coupled to that leg.

12. The switched-capacitor converter of claim 1, wherein the controller is operable to switch the first group of legs on during a first part of each switching cycle and off during a second part of each switching cycle, wherein the controller is operable to switch the second group of legs off during the first part of each switching cycle and on during the second part of each switching cycle, and wherein the controller is operable to use the same zero-crossing information determined for the present switching cycle to modify the point at which each switch device connected to the first group of legs is switched off during the first part of the present switching cycle and modify the point at which each switch device connected to the second group of legs is switched off during the second part of the present switching cycle.

13. The switched-capacitor converter of claim 1, wherein the controller is operable to switch the first group of legs on during a first part of each switching cycle and off during a second part of each switching cycle, wherein the controller is operable to switch the second group of legs off during the first part of each switching cycle and on during the second part of each switching cycle, wherein the controller is operable to use first zero-crossing information determined for the first part of the present switching cycle to modify the point at which each switch device connected to the first group of legs is switched off during the first part of the present switching cycle, and wherein the controller is operable to use second zero-crossing information determined for the second part of the present switching cycle to modify the point at which each switch device connected to the second group of legs is switched off during the second part of the present switching cycle.

14. A method of operating a switched-capacitor converter that includes an input, an output, a rectifier at the output, and a plurality of legs coupled between the input and the rectifier, each leg comprising a capacitor, a first group of the legs being coupled to a first branch of the rectifier and a second group of the legs being coupled to a second branch of the rectifier, and a switch device connected to each leg, the method comprising:
  alternately switching the switch devices connected to the first and the second groups of legs to transfer energy from the input to the output; and
  modifying the switching based on zero-crossing information which indicates, for each leg of the first group of legs, when current through the switch device connected to said each leg crosses or nearly crosses zero, so that each switch device connected to a leg within the first group of legs is turned off when the current through said each switch device crosses or nearly crosses zero and remains off until all switch devices connected to legs within the first group of legs have been turned off for a predetermined amount of time,
  wherein the modified switching turns on at least two switch devices connected to legs within the first group of legs for partially overlapping time intervals within a switching cycle, the partially overlapping time intervals having different time durations.

15. The method of claim 14, further comprising:
  determining the zero-crossing information based on sensed current through each switch device.

16. The method of claim 14, further comprising:
  determining the zero-crossing information based on a derivative of a sensed capacitor voltage across each capacitor of the legs.

17. The method of claim 14, further comprising:
  producing an individual PWM (pulse width modulation) signal for switching each switch device; and
  adjusting the duty cycle of each PWM signal based on the zero-crossing information for the corresponding switch device, so that the duty cycle for each switch device corresponds to the zero-crossing current of that switch device.

18. The method of claim 14, wherein each switch device connected to the first group of legs is implemented as an integrated power stage configured to sense output current of the power stage, the method further comprising:
producing a single PWM (pulse width modulation) signal for switching each switch device connected to the first group of legs; and
adjusting the duty cycle of the PWM signal at each integrated power stage based on the output current of that power stage, so that the duty cycle for the switch device included in the power stage corresponds to the zero-crossing current of that switch device.

19. The method of claim 14, wherein each switch device connected to the first group of legs is implemented as an integrated power stage configured to sense output current of the power stage, the method further comprising:
deriving the zero-crossing information for each leg in the first group from the output current sensed by the integrated power stage of that leg.

20. The method of claim 14, wherein each branch of the rectifier comprises an integrated power stage configured to sense current through that branch, the method further comprising:
deriving the zero-crossing information for each leg from the current sensed by the integrated power stage of the branch coupled to that leg.

21. The method of claim 14, further comprising:
switching the first group of legs on during a first part of each switching cycle and off during a second part of each switching cycle;
switching the second group of legs off during the first part of each switching cycle and on during the second part of each switching cycle; and
modifying the point at which each switch device connected to the first group of legs is switched off during the first part of the present switching cycle and the point at which each switch device connected to the second group of legs is switched off during the second part of the present switching cycle, based on the same zero-crossing information determined for the present switching cycle.

22. The method of claim 14, further comprising:
switching the first group of legs on during a first part of each switching cycle and off during a second part of each switching cycle;
switching the second group of legs off during the first part of each switching cycle and on during the second part of each switching cycle;
modifying the point at which each switch device connected to the first group of legs is switched off during the first part of the present switching cycle, based on first zero-crossing information determined for the first part of the present switching cycle; and
modifying the point at which each switch device connected to the second group of legs is switched off during the second part of the present switching cycle, based on second zero-crossing information determined for the second part of the present switching cycle.

* * * * *